US012085767B2

(12) United States Patent
Zhu et al.

(10) Patent No.: US 12,085,767 B2
(45) Date of Patent: Sep. 10, 2024

(54) PACKAGING STRUCTURE AND PACKAGING METHOD OF EDGE COUPLERS AND FIBER ARRAY

(71) Applicant: SUTENG INNOVATION TECHNOLOGY CO., LTD., Shenzhen (CN)

(72) Inventors: Lin Zhu, Shenzhen (CN); Jing Wang, Shenzhen (CN); Ben Niu, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/889,434

(22) Filed: Aug. 17, 2022

(65) Prior Publication Data
US 2023/0053498 A1 Feb. 23, 2023

(51) Int. Cl.
*G02B 6/42* (2006.01)
*G02B 6/43* (2006.01)

(52) U.S. Cl.
CPC ......... *G02B 6/4212* (2013.01); *G02B 6/4243* (2013.01); *G02B 6/43* (2013.01)

(58) Field of Classification Search
CPC ............................ G02B 6/4212; G02B 6/4243
See application file for complete search history.

(56) References Cited

U.S. PATENT DOCUMENTS

| 10,234,644 B1* | 3/2019 | Butler | G02B 6/02395 |
| 10,288,812 B1* | 5/2019 | Evans | G02B 6/30 |
| 2019/0170945 A1* | 6/2019 | Fortusini | G02B 6/13 |
| 2021/0157056 A1* | 5/2021 | Butler | G02B 6/3652 |
| 2021/0271037 A1* | 9/2021 | Brusberg | G02B 6/4274 |

FOREIGN PATENT DOCUMENTS

GB   2376756 A  * 12/2002  ........... G02B 6/1221

* cited by examiner

*Primary Examiner* — Chris H Chu
(74) *Attorney, Agent, or Firm* — BAYES PLLC (57) ABSTRACT

A packaging structure and a packaging method of edge couplers and a fiber array are provided. The packaging structure includes a silicon substrate, an edge coupler, and a fiber array. Multiple edge couplers are arranged in a main body portion of the silicon substrate, and an end of the edge coupler extends to a step groove of the silicon substrate. At least a part of the cover of the fiber array is accommodated in the step groove. Multiple fibers in the fiber array correspondingly pass through multiple lead channels of the cover and are then coupled with the edge couplers in the step groove. The edge couplers butt the fibers in the fiber array. The cover is moved until a part of the cover is accommodated in the step groove, so that the fibers can be aligned with the edge couplers in the step groove.

8 Claims, 8 Drawing Sheets

PACKAGING STRUCTURE AND PACKAGING METHOD OF EDGE COUPLERS AND FIBER ARRAY

CROSS-REFERENCE TO RELATED APPLICATION

The present application claims the benefit of priority to China Patent Application No. CN202110941648.9, filed on Aug. 17, 2021, the content of which is incorporated herein by reference in its entirety.

TECHNICAL FIELD

This application relates to the technical field of laser detection, and in particular, to a packaging structure and a packaging method of edge couplers and a fiber array.

BACKGROUND

In recent years, with rapid development of silicon-based optoelectronic devices, in addition to their application in the field of optical communications, the silicon-based optoelectronic devices have also received extensive attention in the field of LiDAR. How to achieve high-efficiency coupling transmission between a fiber of the LiDAR and the silicon-based optoelectronic devices is of great significance for development and application of silicon-based optoelectronics.

SUMMARY

Embodiments of this application provide a packaging structure and a packaging method of edge couplers and a fiber array, to optimize a packaging structure of a fiber and a silicon-based optoelectronic device, thereby reducing coupling loss of the fiber and the silicon-based optoelectronic device.

According to a first aspect, an embodiment of this application provides a packaging structure of edge couplers and a fiber array, including a silicon substrate, an edge coupler, and a fiber array. The silicon substrate has a main body portion and an edge portion connected to a side of the main body portion, where the main body portion and the edge portion form a step groove; a plurality of edge couplers are arranged in the main body portion, and an end of each of the edge couplers extends to the step groove; and the fiber array includes a cover and a plurality of fibers, where at least a part of the cover is accommodated in the step groove, the cover has a butting face facing the plurality of edge couplers and a plurality of lead channels that protrude through the cover and extend to the butting face, and the plurality of fibers correspondingly pass through the plurality of lead channels and are then coupled with the plurality of edge couplers at the butting face.

In some exemplary embodiments, each of the edge couplers has a coupling edge, the edge coupler extends until the coupling edge connects a surface of the step groove, each of the fibers includes a fiber core and cladding around a periphery of the fiber core, the fiber core has a fiber edge for butting the coupling edge, and the fiber edge is flush with the butting face; and the packaging structure further includes a refractive index matching layer, the refractive index matching layer is arranged between the surface of the step groove and the butting face, the refractive index matching layer covers the coupling edge and the fiber edge respectively, and the refractive index matching layer is configured to transmit light and reduce coupling loss between the edge couplers and the fibers.

In some exemplary embodiments, the step groove has a first step face and a second step face that are perpendicular to each other, the main body portion has a first surface connected to the first step face, the edge couplers are arranged on the first surface, and the refractive index matching layer extends to partially cover the edge coupler arranged within the first surface, the edge portion has a second surface connected to the second step face, the cover is located on a side on which the step groove and the second surface are located, and the cover has a first connection face that is spaced apart from and opposite the second surface, and the refractive index matching layer also extends to fill a space between the second surface and the first connection face.

In some exemplary embodiments, the cover includes a first cover plate and a second cover plate, the first connection face is located on the first cover plate, the first cover plate further has a second connection face connected to the first connection face, the butting face is located on the second cover plate, the second cover plate also has a third connection face connected to the butting face, and the third connection face is connected to the second connection face; and
a plurality of lead grooves are formed on the third connection face in a one-to-one correspondence with the plurality of fibers, the lead grooves extend to the butting face, and the second connection face and side walls of the lead grooves jointly define the lead channel.

In some exemplary embodiments, the third connection face includes a main portion and a groove portion enclosing the lead groove, the butting face and the main portion are flat and perpendicular to each other, ends of the main portion and the groove portion that are respectively connected to the butting face are accommodated in the step groove, and both the main portion and the groove portion are spaced apart from the surface of the step groove.

In some exemplary embodiments, the second cover plate extends toward a side on which the silicon substrate is located to form a reinforcing portion, the reinforcing portion is located on a side of the butting face away from the third connection face, and the reinforcing portion is fixedly connected to the main body portion.

In some exemplary embodiments, the packaging structure further includes a bonding layer, and the silicon substrate is fixedly connected to the cover by the bonding layer.

In some exemplary embodiments, each of the lead channels is a bar-shaped lead channel, each of the fibers has a first end and a second end that are opposite each other, the first end is adjacent to the butting face, and the second end protrudes from the bar-shaped lead channel.

In some exemplary embodiments, the packaging structure has at least two groups of the edge couplers, the fibers, and the lead channels that are abreast arranged in a one-to-one correspondence manner; and each of the edge couplers further includes a loopback waveguide formed on the silicon substrate, the loopback waveguide is connected to the two edge couplers at both ends, and each of the fibers is configured to receive light and direct the light to each of the edge couplers.

According to a second aspect, an embodiment of this application provides a packaging method of edge couplers and a fiber array, including:
moving a cover of a fiber array, so that a butting face of the cover is accommodated in a step groove of a silicon substrate, and after a plurality of fibers in the fiber array pass through a plurality of lead channels in the cover in a one-to-one correspondence manner, coupling the plurality of fibers with a plurality of edge couplers arranged on the silicon substrate and extending the plurality of fibers to the step groove in a one-to-one correspondence manner;

connecting two of the edge couplers located at two ends, first selecting two of the fibers in the middle and emitting red light into the two fibers respectively, then emitting detection light into one of the two fibers located at the two ends, connecting the other fiber to an optical power meter, and reading an optical power value displayed on the optical power meter; and moving the fiber array until the optical power value displayed on the optical power meter reaches its maximum, and fixedly connecting the cover to the silicon substrate.

In some exemplary embodiments, the fiber array is moved, so that a fiber edge of each of the fibers is moved relative to a coupling edge of each of the edge couplers in the step groove; and a reading of the optical power meter is read in real time until the data displayed on the optical power meter reaches its maximum, a relative position of the silicon substrate and the fiber array are maintained unchanged, and a refractive index matching layer is arranged between a surface of the step groove and the butting face, to fixedly connect the cover to the silicon substrate.

In some exemplary embodiments, a method of moving the fiber array so that the data displayed on the optical power meter reaches its maximum includes:

filling a liquid adhesive for transmitting light in a space between the surface of the step groove and the butting face, continuously moving the fiber array until the reading of the optical power meter reaches its maximum, and curing the liquid adhesive, to form the refractive index matching layer.

In some exemplary embodiments, after the liquid adhesive is filled in the space between the surface of the step groove and the butting face to increase the reading of the optical power meter, the fiber array is further moved until the reading of the optical power meter reaches its maximum.

In some exemplary embodiments, a method for curing the liquid adhesive includes: changing a curing condition in a cascading manner, and when it is observed that the reading of the optical power meter is unchanged or changes within a first value range, controlling the curing condition until the liquid adhesive is cured into the refractive index matching layer.

In some exemplary embodiments, the cover extends toward a side on which the silicon substrate is located to form a reinforcing portion, the reinforcing portion covers the step groove, and the reinforcing portion is connected to the silicon substrate.

Based on the packaging structure and the packaging method of edge couplers and a fiber array in this embodiment of this application, the edge coupler butts the fiber in the fiber array, thereby facilitating implementation of the packaging structure of edge couplers and a fiber array with a plurality of optical paths. A plurality of fibers protrude through the cover, and the cover is arranged to be partially accommodated in the step groove in the silicon substrate, so that the plurality of fibers can be aligned with the plurality of edge couplers in the step groove, thereby facilitating fine adjustment of relative positions of the plurality of fibers and the plurality of edge couplers, which improves alignment precision, reduces coupling loss, and can also effectively improve packaging efficiency.

BRIEF DESCRIPTION OF DRAWINGS

To describe the technical solutions in the embodiments of this application or in the related art more clearly, the following briefly describes the accompanying drawings required for describing the embodiments or the related art. Apparently, the accompanying drawings in the following description show merely some embodiments of this application, and a person skilled in the art may still derive other drawings from these accompanying drawings without creative efforts.

DETAILED DESCRIPTION

To make the objectives, technical solutions, and advantages of this application more comprehensible, the following further describes this application in detail with reference to accompanying drawings and embodiments. It should be understood that the specific embodiments described herein are merely used to explain this application but are not intended to limit this application.

The inventor finds that large coupling loss is caused and a larger volume of an entire packaging structure is required in a transmission manner of coupling an optical signal from a fiber to a silicon-based optoelectronic device by using a grating coupler. However, when an edge coupler with an inverse-tapered waveguide is coupled with the fiber, a fiber core has a larger diameter, which easily causes a problem of spot mismatch between the fiber and the edge coupler, thereby causing large coupling loss. The inventor also finds that a size of an edge of the edge coupler that is configured to receive light can be designed to be basically the same as an edge size of the fiber, which can effectively reduce the coupling loss. In addition, when there are a plurality of optical channels, alignment stability and accuracy of the edge of the edge coupler and the edge of the fiber needs to be further considered, which increases packaging difficulty. Therefore, to resolve the foregoing problem, an embodiment of this application provides a packaging structure of edge couplers and a fiber array.

FIG. 1 to FIG. 7 are schematic structural diagrams of a packaging structure of edge couplers and a fiber array according to an embodiment of this application. The packaging structure of edge couplers and a fiber array includes a silicon substrate 100, an edge coupler 200, and a fiber array 300. The edge coupler 200 is arranged on the silicon substrate 100, and a fiber 320 in the fiber array 300 is coupled with an end of the edge coupler 200, to form a light transmission channel for transmitting light.

Figure 1:
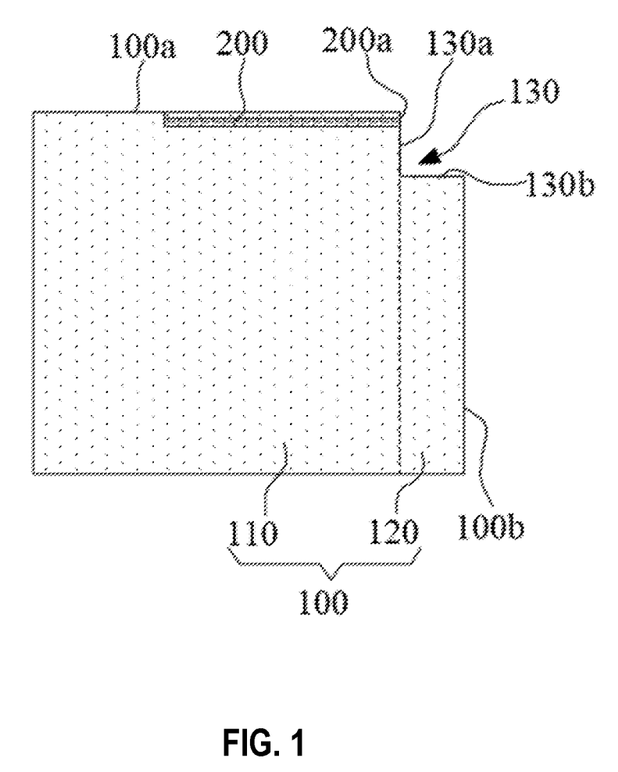
FIG. 1 is a cross-sectional view illustrating that an edge coupler in a packaging structure of edge couplers and a fiber array is mounted on a silicon substrate according to an embodiment of this application.
Figure 2:
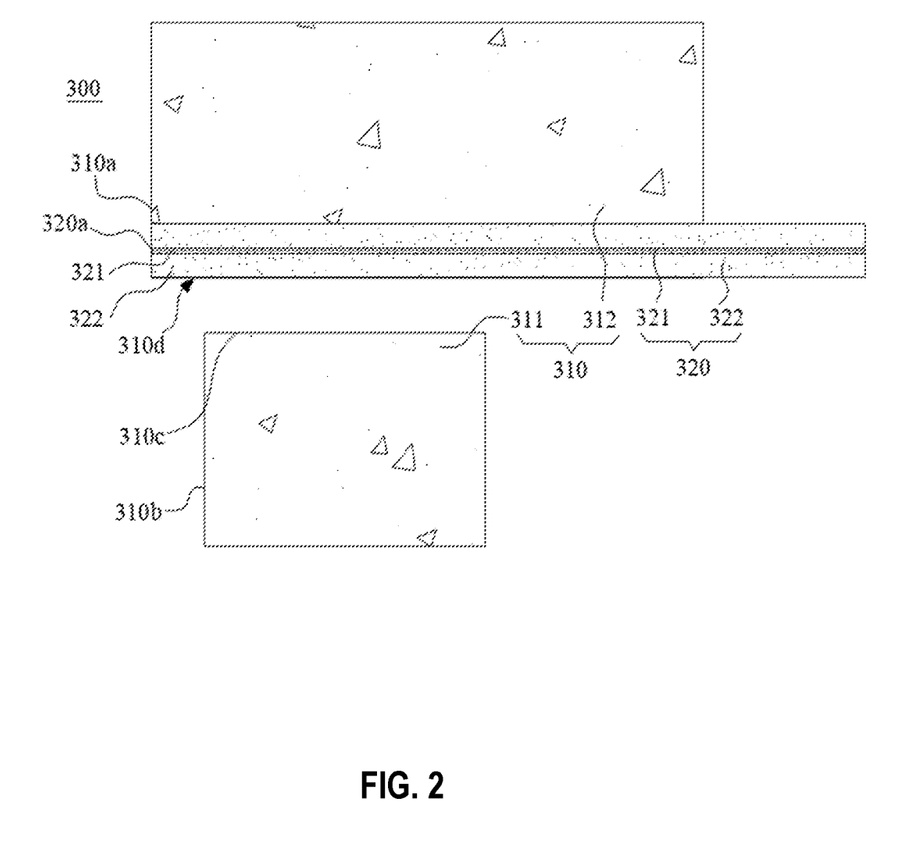
FIG. 2 is a cross-sectional view of a fiber array in which a first cover is to be mounted on a second cover in a packaging structure of edge couplers and a fiber array according to an embodiment of this application.

Specifically, as shown in FIG. 1, the silicon substrate 100 has a main body portion 110 and an edge portion 120 connected to a side of the main body portion 110, and the main body portion 110 and the edge portion 120 form a step groove 130. The step groove 130 has a first step face 130a and a second step face 130b that are perpendicular to each other. The first step face 130a is located on a surface of the main body portion 110, and the second step face 130b is located on a surface of the edge portion 120. The main body portion 110 and the edge portion 120 may be first integrally processed, and then the step groove 130 is machined at a connection position of the main body portion 110 and the edge portion 120.

A plurality of edge couplers 200 are provided on the main body portion 110, and an end of each of the edge couplers 200 extends to the step groove 130. The main body portion 110 may include a first surface 100a connected to the first step face 130a of the step groove 130. The plurality of edge couplers 200 may be arranged on the first surface 100a of the main body portion 110, or a groove may also be arranged on the first surface 100a, so that the plurality of edge couplers 200 are accommodated in the groove on the first surface 100a. The groove on the first surface 100a extends to be connected to the step groove 130, so that the edge coupler 200 can extend to the step groove 130.

Figure 3:
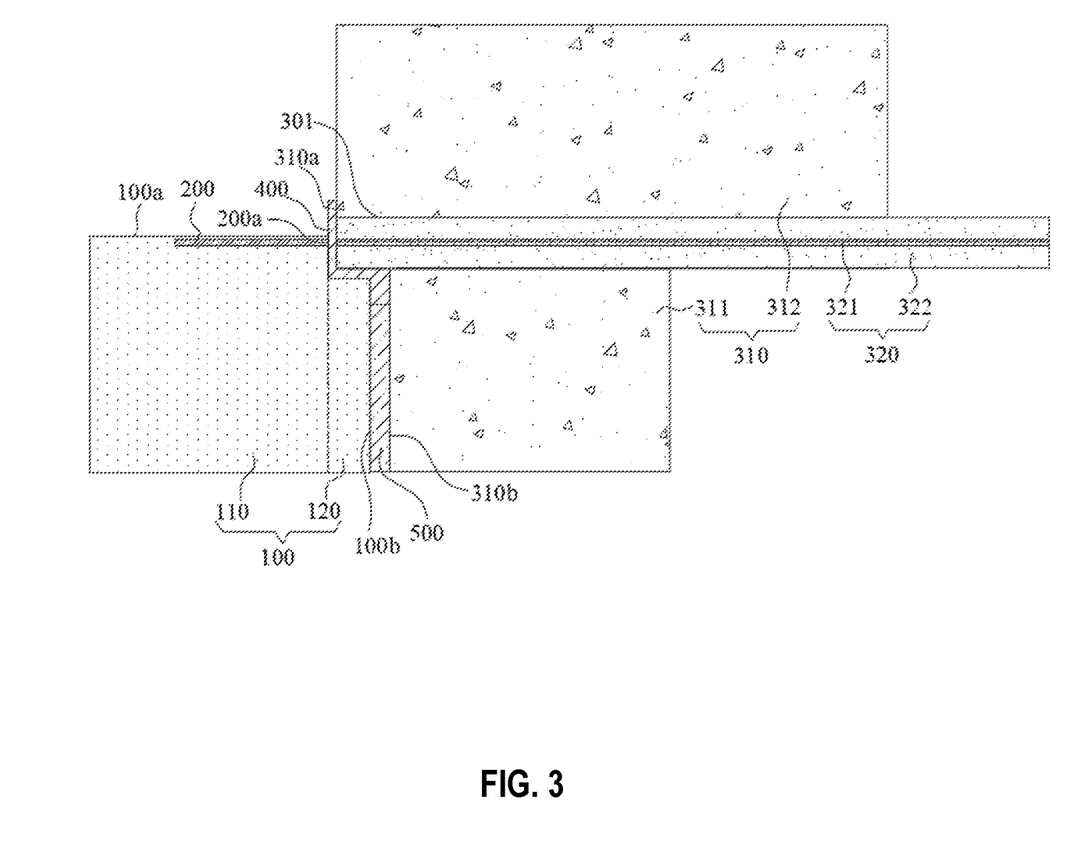
FIG. 3 is a cross-sectional view of a packaging structure of edge couplers and a fiber array according to an embodiment of this application.
Figure 4:
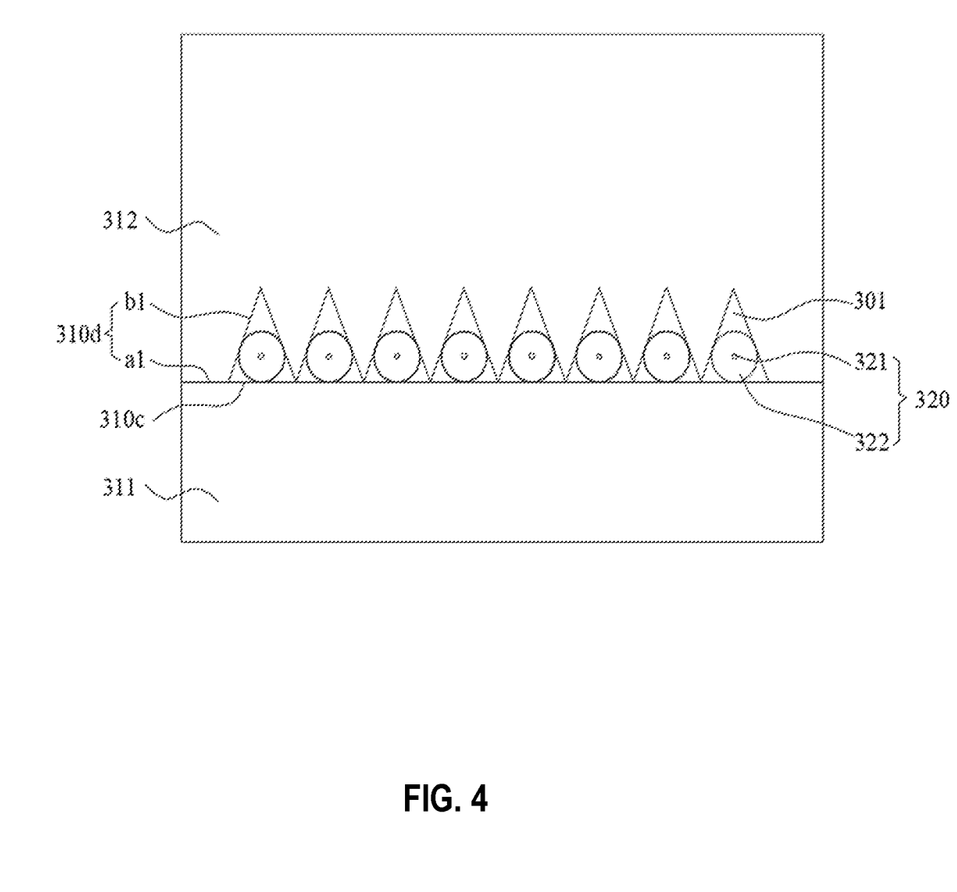
FIG. 4 is a side view of a fiber array in a packaging structure of edge couplers and a fiber array according to an embodiment of this application.
Figure 5:
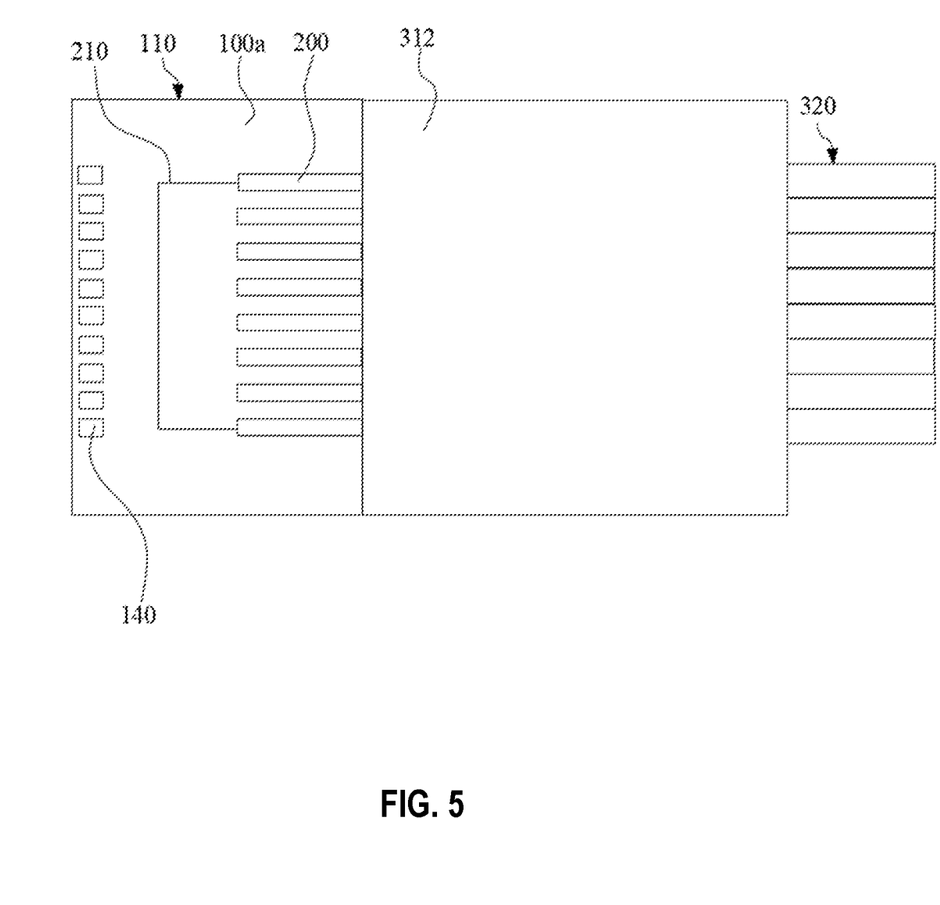
FIG. 5 is a top view of a packaging structure of edge couplers and a fiber array according to an embodiment of this application.

The fiber array 300 includes a cover 310 and a plurality of fibers 320. As shown in FIG. 3 and FIG. 4, at least a part of the cover 310 is accommodated in the step groove 130, and the cover 310 has a butting face 310a and a plurality of lead channels 301. The butting face 310a faces the plurality of edge couplers 200, and the lead channels 301 protrude through the cover 310 and extend to the butting face 310a. The plurality of fibers 320 correspondingly pass through and are fixed in the plurality of lead channels 301 and are then coupled with the plurality of edge couplers 200 at the butting face 310a.

In the packaging structure of edge couplers and a fiber array provided in this embodiment of this application, the edge coupler 200 butts the fiber 320 in the fiber array 300, thereby facilitating packaging the packaging structure of edge couplers and a fiber array with a plurality of optical paths. A plurality of fibers 320 protrude through the cover 310, and the cover 310 is moved until a part of the cover 310 is accommodated in the step groove 130 in the silicon substrate 100, so that the plurality of fibers 320 can be aligned with the plurality of edge couplers 200 in the step groove 130, thereby facilitating fine adjustment of relative positions of the plurality of fibers 320 and the plurality of edge couplers 200, which improves alignment precision, reduces coupling loss, and can also effectively improve packaging efficiency.

The fiber 320 includes a fiber core 321 and cladding 322 around a periphery of the fiber core 321. The cladding 322 is configured to protect the fiber 320, and the fiber core 321 is configured to butt the edge coupler 200 to transmit light to the edge coupler 200. That is, during packaging, an edge size of the fiber core 321 is selected to be similar to an edge size of the edge coupler 200. During alignment, the edge of the fiber core 321 butts a corresponding edge of the edge coupler 200, thereby forming a smooth optical path.

Specifically, each of the edge couplers 200 has a coupling edge 200a. The edge coupler 200 extends until the coupling edge 200a connects the first step face 130a of the step groove 130. The first step face 130a is flat. The coupling edges 200a of a plurality of the edge couplers 200 can be set to be flush with the first step face 130a, and the butting face 310a is set to be flat and parallel to the first step face 130a. The fiber core 321 has a fiber edge 320a configured to butt the coupling edge 200a, and a surface of an end of the fiber 320 on which the fiber edge 320a is arranged is flush with the butting face 310a, so that the plurality of coupling edges 200a and edges of the plurality of fibers 320 are arranged orderly respectively, to avoid an excessively bulged structure that affects movement of the fiber 320 relative to the edge coupler 200, thereby improving alignment efficiency. Further, a size of the fiber edge 320a of the fiber core 321 can be set to be similar to or the same as a size of the coupling edge 200a of the edge coupler 200, so that the fiber edge 320a of the fiber core 321 matches the coupling edge 200a of the edge coupler 200, to resolve a spot matching problem, thereby effectively reducing the coupling loss.

After the coupling edges 200a of the plurality of edge couplers 200 are accurately aligned with the fiber edges 320a of the fibers 320, a connection structure may be arranged to fix the coupling edge 200a, the fiber edge 320a and an adjacent structure. Specifically, in some exemplary embodiments, the packaging structure of edge couplers and a fiber array may further include a refractive index matching layer 400. The refractive index matching layer 400 may be arranged between the surface of the step groove 130 and the butting face 310a, and the refractive index matching layer 400 covers the coupling edge 200a and the fiber edge 320a respectively. The coupling edge 200a and the fiber edge 320a are fixedly connected by using the refractive index matching layer 400, and the first step face 130a of the step groove 130 and the butting face 310a of the cover 310 are fixedly connected by using the refractive index matching layer 400, to fully ensure connection stability of the coupling edge 200a and the fiber edge 320a while preventing an external impurity from entering a space between the coupling edge 200a and the fiber edge 320a and causing interference to light transmission.

It should be noted that, to ensure smooth light transmission, the refractive index matching layer 400 needs to be configured to transmit light and reduce coupling loss between the edge coupler 200 and the fiber 320. When the refractive index matching layer 400 is configured to reduce the coupling loss, the refractive index matching layer 400 may be arranged to cover the fiber edge 320a, the coupling edge 200a, and a surface of an adjacent zone of the two, to reduce reflection of light between the fiber 320 and the edge coupler 200, thereby reducing the coupling loss. For example, if a refractive index of air is denoted as 1, a refractive index of a selected refractive index matching layer 400 is greater than or equal to that, which can effectively reduce the reflection of light.

Specifically, the edge coupler 200 is arranged on the first surface 100a of the main body portion 110. The refractive index matching layer 400 between the fiber edge 320a and the coupling edge 200a may further extend to partially cover the edge coupler 200 arranged within the first surface 100a.

The edge portion 120 has a second surface 100b connected to the second step face 130b. The cover 310 is located on a side on which the step groove 130 and the second surface 100b are located. The cover 310 has a first connection face 310b that is opposite and spaced apart from the second surface 100b, and the refractive index matching layer 400 also extends to fill a space between the second surface 100b and the first connection face 310b, so that the refractive index matching layer 400 fully fills a space between the fiber edge 320a and the coupling edge 200a and a space between surfaces of adjacent zones of the two, to prevent an external substance from entering and causing interference to light transmission, thereby ensuring alignment stability of the fiber edge 320a and the coupling edge 200a. To facilitate filling the refractive index matching layer 400 in a space between the surface of the step groove 130 and a surface such as the butting face 310a after the alignment step is completed, a liquid adhesive may be first filled in a space between the surfaces and then cured to form a solid refractive index matching layer 400 to fixedly connect the surfaces.

In some exemplary embodiments, the cover 310 includes a first cover plate 311 and a second cover plate 312. The first connection face 310b is located on the first cover plate 311, and the first cover plate 311 further has a second connection face 310c connected to the first connection face 310b. The butting face 310a is located on the second cover plate 312, and the second cover plate 312 also has a third connection face 310d connected to the butting face 310a. The third connection face 310d is connected to the second connection face 310c. A plurality of lead grooves in a one-to-one correspondence with the plurality of fibers 320 are formed on the third connection face 310d. The lead grooves extend to the butting face 310a. The second connection face 310c and a side wall of the lead groove jointly define the lead channel 301. During assembly, the plurality of fibers 320 may be put in the plurality of lead grooves in a one-to-one correspondence manner. The first cover plate 311 is moved to fix the second connection face 310c to the third connection face 310d, so that the second connection face 310c covers a plurality of lead grooves to form a plurality of independent lead channels 301, thereby mounting the plurality of fibers 320 into the lead channel 301. The fiber 320 may be put in the lead groove before the second connection face 310c is fixed to the third connection face 310d. After the second connection face 310c covers the lead groove, an outer surface of the fiber 320 is respectively attached to the side wall of the lead groove and the second connection face 310c, so that the fiber 320 can move synchronously with the cover 310.

The fiber 320 has a first end and a second end that are opposite each other. The first end is adjacent to the butting face 310a, and the fiber edge 320a is arranged at the first end. After alignment of the coupling edge 200a and the fiber edge 320a is completed, the refractive index matching layer 400 is connected to the first end of the fiber 320, to fix the first end of the fiber 320. A second end of the fiber protrudes from a bar-shaped lead channel 301. After the refractive index matching layer 400 is fixedly connected to the first end of the fiber 320, a part of the fiber 320 that is adjacent to the second end is further fixed in the lead channel 301 or fixed to the cover 310, to avoid random shaking of the second end of the fiber 320 and the part between the first end and the second end.

To facilitate mounting of the fiber 320 into the lead channel 301, the lead channel 301 can be set as the bar-shaped lead channel 301 perpendicular to the first step face 130a, and correspondingly, the lead groove is a bar-shaped lead groove perpendicular to the first step face 130a. The second connection face 310c is a flat surface perpendicular to the first step face 130a. In addition, to improve connection stability between the second connection face 310c and the third connection face 310d, as shown in FIG. 4, the third connection face 310d includes a main portion a1 and a groove portion b1 enclosing the lead groove. The main portion a1 is a flat surface parallel to the second connection face 310c. The fiber 320 has a circular cross-section in its length direction. The groove portion b1 may be set as a V-shaped groove with a V-shaped cross-section in a direction perpendicular to the first step face 130a. The V-shaped groove and the second connection face 310c jointly define a channel with a triangular cross-section in a direction perpendicular to the first step face 130a, to limit a movement of the fiber 320 in its radial direction.

Ends of the main portion a1 and the groove portion b1 that are respectively connected to the butting face 310a are accommodated in the step groove 130, so that the fiber edge 320a of the fiber 320 can butt the coupling edge 200a of the edge coupler 200 in the step groove 130. The main portion a1 and the groove portion b1 are both spaced apart from the surface of the step groove 130. Specifically, the groove portion b1 is spaced apart from the first step face 130a of the step groove 130, and the main portion a1 is spaced apart from the second step face 130b. In addition, the butting face 310a is spaced apart from the first step face 130a of the step groove 130, and the second surface 100b is spaced apart from the first connection face 310b, so that the cover 310 can drive an end of the fiber 320 arranged with the fiber edge 320a to flexibly move in the step groove 130 relative to the edge coupler 200, to find a butting position with the lowest coupling loss.

Figure 6:
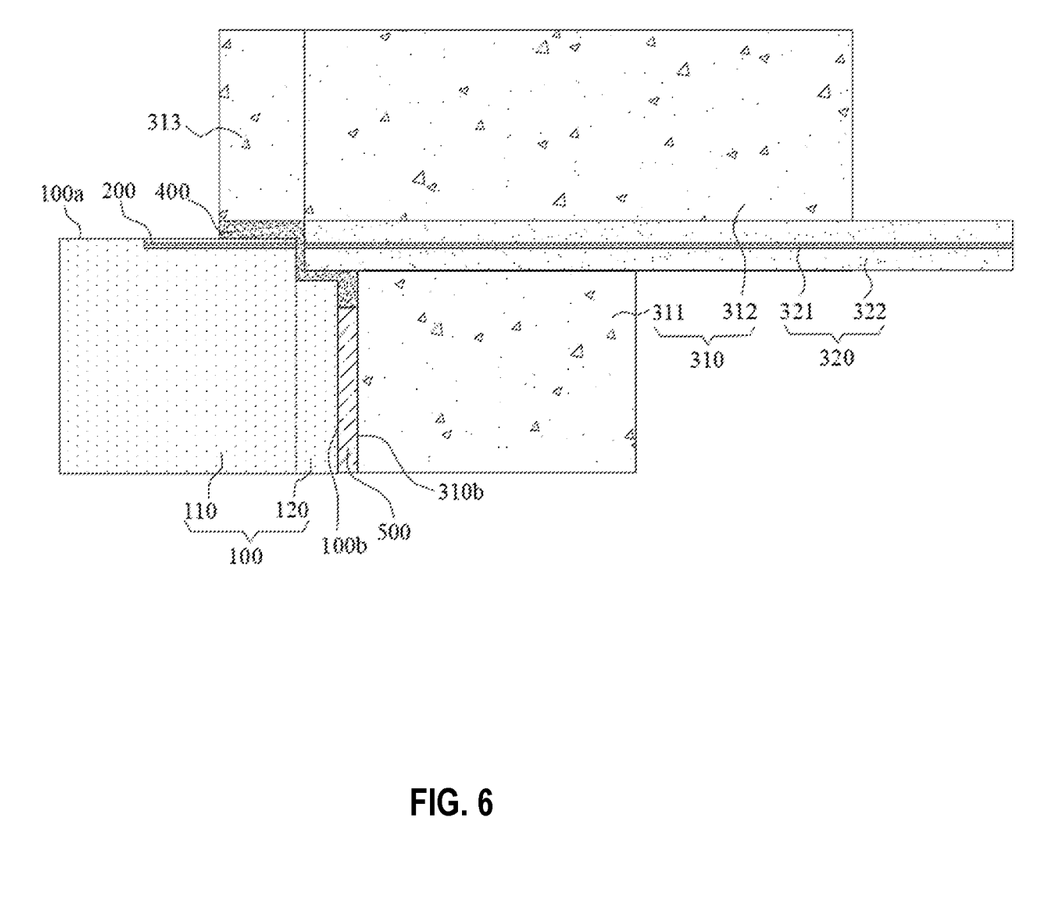
FIG. 6 is a cross-sectional view of a packaging structure of edge couplers and a fiber array that is arranged with a reinforcing portion according to an embodiment of this application.
Figure 7:
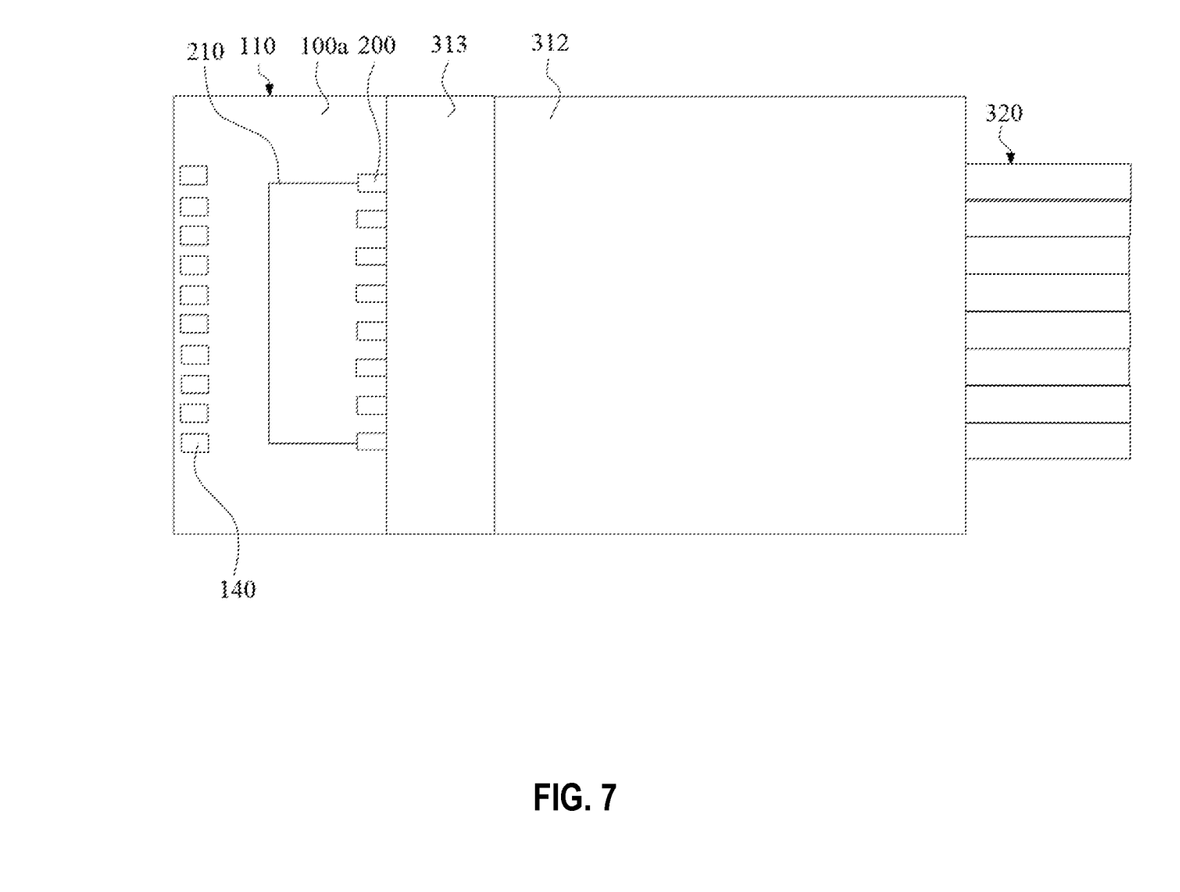
FIG. 7 is a top view of a packaging structure of edge couplers and a fiber array that is arranged with a reinforcing portion according to an embodiment of this application.

In some exemplary embodiments, as shown in FIG. 6 and FIG. 7, the second cover plate 312 further extends toward a side on which the silicon substrate 100 is located to form a reinforcing portion 313. The reinforcing portion 313 is located on a side of the butting face 310a away from the third connection face 310d, and the reinforcing portion 313 is fixedly connected to the main body portion 110. Specifically, the reinforcing portion 313 is connected to the first surface 100a of the main body portion 110, extends to the refractive index matching layer 400 connected to the edge coupler 200 on the first surface 100a, and is further connected to a surface of the reinforcing portion 313, so that the refractive index matching layer 400 fills a space between the reinforcing portion 313 and the edge coupler 200, to further improve packaging stability.

In some exemplary embodiments, the packaging structure further includes a bonding layer 500, and the silicon substrate 100 is fixedly connected to the cover 310 by the bonding layer 500. The bonding layer 500 may be connected to the edge portion 120 and the first cover plate 311. The bonding layer 500 may also be connected to the main body portion 110 and the second cover plate 312. When the cover 310 is arranged with the reinforcing portion 313, the bonding layer 500 may also be connected to the reinforcing portion 313 and the main body portion 110. In addition, the bonding layer 500 can also cover an outer surface of the refractive index matching layer 400 and be connected to the silicon substrate 100 and the cover 310, to help increase connection stability of a structure adjacent to the solid refractive index matching layer 400 and further ensure butting stability of the coupling edge 200a and the fiber edge 320a.

The packaging structure has at least two groups of edge couplers 200, fibers 320, and lead channels 301 that are abreast arranged in a one-to-one correspondence manner. For example, there may be eight groups of edge couplers 200, fibers 320, and lead channels 301. The edge coupler 200 further includes a loopback waveguide 210 formed on the silicon substrate 100, and the loopback waveguide 210 is connected to the two edge couplers 200 at both ends. The fiber 320 is configured to receive light and direct the light to the edge couplers 200. During detection, the two fibers 320 at two ends are respectively configured to butt a detection light source and an optical power meter, and the two fibers 320 in the middle are respectively configured to butt two red light pens and to receive red light emitted by the red light pens. When detection light emitted by the detection light source to the fiber 320 is transmitted to an edge coupler 200 corresponding to the current fiber 320, a power value displayed on the power meter is read. The fiber array 300 is moved until the power value displayed on the power meter reaches a maximum value, which indicates that the alignment is completed, and then each structure can be fixed.

Figure 8:
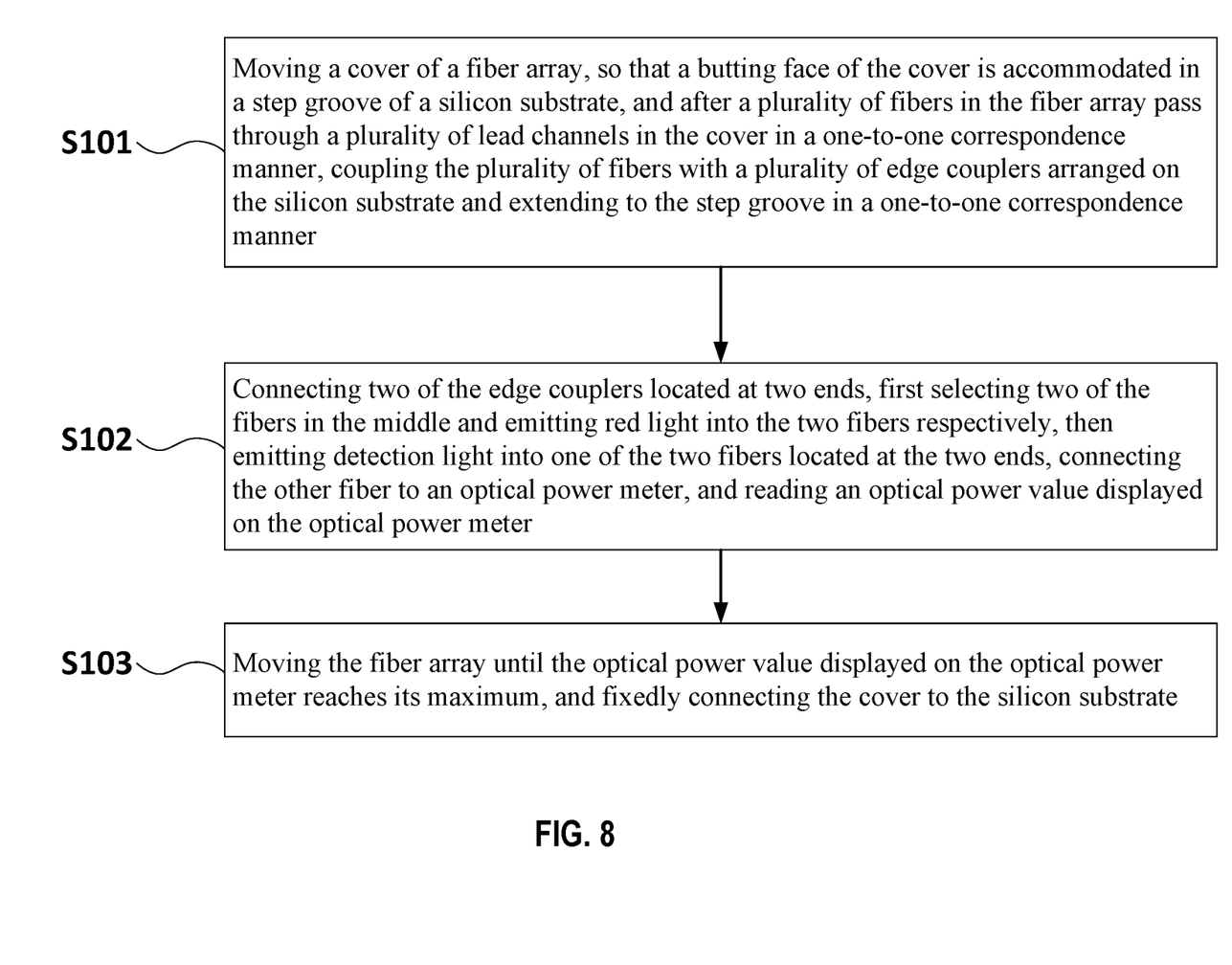
FIG. 8 is a flowchart of a packaging method of edge couplers and a fiber array with respect to a packaging structure of edge couplers and a fiber array according to an embodiment of this application.

According to a second aspect, an embodiment of this application further provides a packaging method of an edge coupler 200 and a fiber array 300, the method is used to implement a packaging structure of edge couplers and a fiber array, and the method includes:

Step S101: Move a cover 310 of a fiber array 300, so that a butting face 310*a* of the cover 310 is accommodated in a step groove 130 of a silicon substrate 100, and after a plurality of fibers 320 in the fiber array 300 pass through a plurality of lead channels 301 in the cover 310 in a one-to-one correspondence manner, couple the plurality of fibers 320 with a plurality of edge couplers 200 arranged on the silicon substrate 100 and extend the plurality of fibers 320 to the step groove 130 in a one-to-one correspondence manner.

Step S102: Connect two edge couplers 200 located at two ends, first select two fibers 320 in the middle and emit red light into the two fibers respectively, then emit detection light into one of the two fibers 320 located at the two ends, connect the other fiber to an optical power meter, and read an optical power value displayed on the optical power meter.

Step S103: Move the fiber array 300 until the maximum optical power value is displayed on the optical power meter, and fixedly connect the cover 310 to the silicon substrate, to finish packaging.

The following describes the packaging method of an edge coupler 200 and a fiber array 300 in this application with reference to specific embodiments. The method includes the following steps:

Step S201: Assemble a fiber array 300, select and move a plurality of the fibers 320 to a side on which a third connection face 310*d* of the second cover plate 312 is located, and after the plurality of fibers 320 are aligned with a groove portion b1 of the third connection face 310*d*, put the fiber 320 in a lead groove, adjust fiber edges 320*a* of the plurality of fibers 320 to make the fiber edges 320*a* flush with the butting face 310*a* of the second cover plate 312, and move the first cover plate 311, so that the second connection face 310*c* of the first cover plate 311 covers the lead groove and is connected to the main portion a1 of the third connection face 310*d*, so that an outer surface of outer cladding 322 of the fiber 320 is attached to the lead groove and the second surface 100*b* respectively. The first cover plate 311 is moved in a direction perpendicular to and away from the butting face 310*a*, so that the second connection face 310*c* and the butting face 310*a* are staggered, and the first connection face 310*b* of the first cover plate 311, a part of the third connection face 310*d*, and the butting face 310*a* form a protruding step. Finally, fixedly connect the first cover plate 311 and the second cover plate 312 through bonding or the like, and assemble them into the fiber array 300.

Step S202: Fix the silicon substrate 100, and fix the silicon substrate 100 on a base of a coupling alignment bench. The silicon substrate 100 can be directly fixed on the base; or after the silicon substrate 100 is fixed on a fixing plate, the fixing plate with the silicon substrate 100 can be fixed on the base. The fixing plate can be a metal heat sink or ceramic substrate, and the silicon substrate 100 can be pasted on the metal heat sink or ceramic substrate and then heated to fix the silicon substrate 100 on the metal heat sink or ceramic substrate. When there are a plurality of silicon substrates 100, the plurality of silicon substrates 100 are fixed on the base, and a position of the fixing plate or the silicon substrate 100 can be adjusted, so that sides of the plurality of silicon substrates 100 away from the edge coupler 200 are flush.

Step S203: Perform coupling coarse alignment. Clamp the cover 310 of the fiber array 300 by using a clamp, and move the cover 310 to butt the silicon substrate 100 fixed on the base. Specifically, an end of the fiber 320 that is arranged with a fiber edge 320*a*, the butting face 310*a*, and a part of the third connection face 310*d* are accommodated in the step groove 130 of the silicon substrate 100, and a position of the fiber array 300 is preliminarily adjusted under a microscope, so that the fiber edge 320*a* of the fiber 320 correspond to the coupling edge 200*a* of the edge coupler 200.

When there are a plurality of edge couplers 200 and fibers 320, one of the fibers 320 at both ends is selected to be connected to a detection light source that can emit light, and the other fiber 320 is connected to the optical power meter. Two of a plurality of fibers 320 in the middle are selected to be connected to the red light pen, and the two red light pens are turned on to emit red light into the corresponding fiber 320. The position of the fiber array 300 is moved, and after it is observed that the light enters the edge coupler 200 from the fiber 320, the coupling coarse alignment is completed.

Step S204: Perform coupling fine alignment. Turn on the detection light source, emit detection light to the corresponding fiber 320, finely adjust the position of the fiber array 300, move the fiber edge 320*a* relative to the coupling edge 200*a* in the step groove 130, read a reading of the optical power meter in real time, and maintain relative positions of the silicon substrate 100 and the fiber array 300 unchanged after the maximum data is displayed on the optical power meter.

Step S205: Dispense an adhesive. Fill light-transmittable liquid adhesive in a space between a surface of the step groove 130, the butting face 310*a*, and the third surface, and after a greater reading of the optical power meter is read, further adjust the position of the fiber array 300, and determine the position of the corresponding fiber array 300 as an optimal packaging position after the maximum reading is displayed on the optical power meter.

Step S206: Cure the adhesive. Irradiate the liquid adhesive in Step S205 in a manner such as ultraviolet light irradiation until the liquid adhesive is cured to form the refractive index matching layer 400.

During curing, a curing condition is changed in a cascading manner, and when it is observed that the reading of the optical power meter is unchanged or changes within a first value range, the curing condition is controlled until the liquid adhesive is cured into the refractive index matching layer. For example, when forming the refractive index matching layer 400 by curing through irradiation with an ultraviolet lamp, ascending curing power is set from small to large, and ascending curing time is set from short to long, so that stress caused by thermal expansion can be released in a timely manner and the fiber array 300 can be prevented from deviating from the optimal position. Specific curing time and power are adjusted based on an amount of the liquid adhesive filled. During curing, the value displayed on the optical power meter is always monitored. If the value displayed on the optical power meter falls below a preset first value, the power of the ultraviolet lamp is adjusted in a timely manner to release the stress during curing in a timely manner, so that the fiber array 300 is always maintained in the optimal position until the reading of the optical power meter no longer changes.

Step S207: Perform packaging. Fill the liquid adhesive in a space between the second surface 100b of the edge portion 120 of the silicon substrate 100 and the first connection face 310b of the second cover plate 312, and cure the liquid adhesive to form the bonding layer 500 to fix the silicon substrate 100 to the fiber array 300, thereby maintaining a relative position of the coupling edge 200a of the edge coupler 200 and the fiber edge 320a of the fiber 320 unchanged. Through a mounting method of first curing the refractive index matching layer 400 to fix the coupling edge 200a and the fiber edge 320a, and then arranging the bonding layer 500 to fix the silicon substrate 100 and the fiber array 300, the refractive index matching layer 400 can protect the coupling edge 200a and the fiber edge 320a, thereby preventing deformation stress in a process of curing the liquid adhesive to form the bonding layer 500 from affecting relative stability of the coupling edge 200a and the fiber edge 320a.

Further, the second cover plate 312 may extend toward a side on which the silicon substrate 100 is located to form a reinforcing portion 313, and the reinforcing portion 313 is located on a side of the butting face 310a away from the third connection face 310d. The reinforcing portion 313 covers the step groove 130, and the reinforcing portion 313 butts the main body portion 110 of the silicon substrate 100. If the refractive index matching layer 400 extends to the first surface 100a of the main body portion 110 on which the edge coupler 200 is mounted, the refractive index matching layer 400 also needs to be connected to the reinforcing portion 313, and a liquid adhesive is filled in a space between the edge coupler 200, the first surface 100a, and the surface of the reinforcing portion 313, to increase packaging stability.

The silicon substrate 100 is also arranged with a metal electrode 140 that is electrically connected to another external structure. It should be noted that when arranging the reinforcing portion 313, a position on which the metal electrode 140 is located should be avoided.

Step S208: Fix a tail of a fiber, so that an end of the fiber 320 away from the fiber edge 320a protrudes from the lead channel 301 of the cover 310 and deformation stress of each structure during the process of curing the refractive index matching layer 400 can be well released. After the refractive index matching layer 400 is cured, the end of the fiber 320 away from the fiber edge 320a can be fixed to the cover 310, to improve mounting stability of the fiber 320.

Step S209: Perform heating and aging treatments, remove the edge coupler 200, the fiber array 300, and the silicon substrate 100 separately from the base and the clamp after the tail of the fiber is fixed, and then perform the heating and aging treatments at high temperature, to obtain a stable packaging structure of edge couplers and a fiber array. Tests are further performed by using the detection light source and the power meter, so that coupling loss of a final packaging structure can be obtained.

The same or similar reference signs in the drawings of the embodiments correspond to the same or similar components. In descriptions of this application, it should be understood that azimuth or position relationships indicated by terms such as "above," "under," "left," and "right" are based on the azimuth or position relationships shown in the accompanying drawings, are merely intended to describe this application and simplify the descriptions, but are not intended to indicate or imply that the specified device or element shall have specific azimuth or be formed and operated in specific azimuth, and therefore, the terms for describing the position relationships in the drawings are only used for exemplary illustration, and should not be construed as a limitation on this patent. A person of ordinary skill in the art can understand specific meanings of the foregoing terms based on a specific situation.

The foregoing descriptions are only preferred embodiments of this application, and are not intended to limit this application. Any modification, equivalent replacement and improvement made within the spirit and principle of this application shall be included within the protection scope of this application.

What is claimed is:

1. A packaging structure of edge couplers and a fiber array, comprising:
   a silicon substrate, having a main body portion and an edge portion connected to a side of the main body portion, wherein the main body portion and the edge portion form a step groove;
   edge couplers, wherein a plurality of edge couplers are arranged in the main body portion, and an end of each of the edge couplers extends to the step groove; and
   a fiber array, comprising a cover and a plurality of fibers, wherein at least a part of the cover is accommodated in the step groove,
      wherein the cover has a butting face facing the plurality of edge couplers and a plurality of lead channels that protrude through the cover and extend to the butting face, and
      wherein the plurality of fibers correspondingly pass through the plurality of lead channels and are then coupled with the plurality of edge couplers at the butting face;
   wherein the step groove has a first step face and a second step face that are perpendicular to each other, the main body portion has a first surface connected to the first step face, the edge couplers are arranged on the first surface, and the edge portion has a second surface connected to the second step face, in a direction perpendicular to the second step face, the first surface is connected to the side of the first step face deviating from the second step face, in a direction perpendicular to the first step face, the second surface is connected to the side of the second step face deviating from the first step face;
   wherein the cover is located on a side on which the step groove and the second surface are located, and the cover comprises a first cover plate and a second cover plate, wherein the first cover plate has a first connection face that is opposite and spaced apart from the second surface, and the first cover plate further has a second connection face connected to the first connection face, wherein the second cover plate has the butting face and a third connection face connected to the butting face, and the third connection face is connected to the second connection face, wherein a plurality of lead grooves are formed on the third connection face in a one-to-one correspondence with the plurality of fibers, the lead grooves extend to the butting face, and the second connection face and side walls of the lead grooves jointly define the lead channels; and wherein an end of the third connection face connected to the butting face is accommodated in the step groove.

2. The packaging structure of edge couplers and a fiber array according to claim 1, further comprising a refractive index matching layer, wherein each of the edge couplers has a coupling edge, and extends until the coupling edge connects a surface of the step groove, wherein each of the fibers comprises a fiber core and cladding around a periphery of the fiber core, the fiber core has a fiber edge for butting the coupling edge, and the fiber edge is flush with the butting face, and wherein the refractive index matching layer is arranged between the surface of the step groove and the butting face, the refractive index matching layer covers the coupling edge and the fiber edge respectively, and the refractive index matching layer is configured to transmit light and reduce coupling loss between the edge couplers and the fibers.

3. The packaging structure of edge couplers and a fiber array according to claim 2, wherein the refractive index matching layer extends to partially cover the edge couplers arranged within the first surface, and wherein the refractive index matching layer extends to fill a space between the second surface and the first connection face.

4. The packaging structure of edge couplers and a fiber array according to claim 3, wherein the third connection face comprises a main portion and a groove portion enclosing the lead groove, wherein the butting face and the main portion are flat and perpendicular to each other, wherein ends of the main portion and the groove portion that are respectively connected to the butting face are accommodated in the step groove, and wherein both the main portion and the groove portion are spaced apart from the surface of the step groove.

5. The packaging structure of edge couplers and a fiber array according to claim 3, wherein the second cover plate extends toward a side on which the silicon substrate is located to form a reinforcing portion, and wherein the reinforcing portion is located on a side of the butting face away from the third connection face, and the reinforcing portion is fixedly connected to the main body portion.

6. The packaging structure of edge couplers and a fiber array according to claim 1, further comprising a bonding layer, wherein the silicon substrate is fixedly connected to the cover by the bonding layer.

7. The packaging structure of edge couplers and a fiber array according to claim 1, wherein each of the lead channels is a bar-shaped lead channel, wherein each of the fibers has a first end and a second end that are opposite each other, and wherein the first end is adjacent to the butting face, and the second end protrudes from the bar-shaped lead channel.

8. The packaging structure of edge couplers and a fiber array according to claim 1, wherein the packaging structure has at least two groups of the edge couplers, the fibers, and the lead channels that are abreast arranged in a one-to-one correspondence manner, wherein the packaging structure further comprises a loopback waveguide formed on the silicon substrate, and the loopback waveguide is connected to the two edge couplers at both ends, and wherein each of the fibers is configured to receive light and direct the light to the each of the edge couplers.

* * * * *